United States Patent [19]
Gresser et al.

[11] 4,392,476
[45] Jul. 12, 1983

[54] METHOD AND APPARATUS FOR PLACING IDENTIFYING INDICIA ON THE SURFACE OF PRECIOUS STONES INCLUDING DIAMONDS

[75] Inventors: Herbert D. Gresser, Plainview; George Kaplan, Port Chester; Joseph Nussenbaum, New York, all of N.Y.

[73] Assignee: Lazare Kaplan & Sons, Inc., New York, N.Y.

[21] Appl. No.: 220,195

[22] Filed: Dec. 23, 1980

[51] Int. Cl.$^3$ ............................ B28D 5/00
[52] U.S. Cl. ............................ 125/30 R; 63/32; 219/121 L
[58] Field of Search ............................ 125/30 R; 63/32; 219/121 L, 121 LM

[56] References Cited

U.S. PATENT DOCUMENTS

| | | | |
|---|---|---|---|
| 2,293,100 | 8/1942 | Baumgold | 125/30 R |
| 2,332,574 | 10/1943 | Hopp | 125/30 R |
| 3,627,858 | 12/1971 | Parts | 219/121 LM |
| 4,056,952 | 11/1977 | Okuda | 63/62 |
| 4,143,544 | 3/1979 | DeVries et al. | 73/104. |
| 4,156,124 | 5/1979 | Macken | 219/121 L |

FOREIGN PATENT DOCUMENTS

| | | |
|---|---|---|
| 877326 | 7/1979 | Belgium . |
| 130318 | 3/1978 | German Democratic Rep. ... 125/30 R |
| 133023 | 11/1978 | German Democratic Rep. ... 125/30 R |

OTHER PUBLICATIONS

*Optics and Laser Technology*, "Printing of Part Numbers using High Power Laser Beam", pp. 256-265, Dec. 1973.

*Primary Examiner*—Harold D. Whitehead

[57] ABSTRACT

A practice for applying indicia to the surface of a precious stone wherein a source of laser energy is directed at the stone surface and controlled to inscribe the surface with the desired indicia.

52 Claims, 3 Drawing Figures

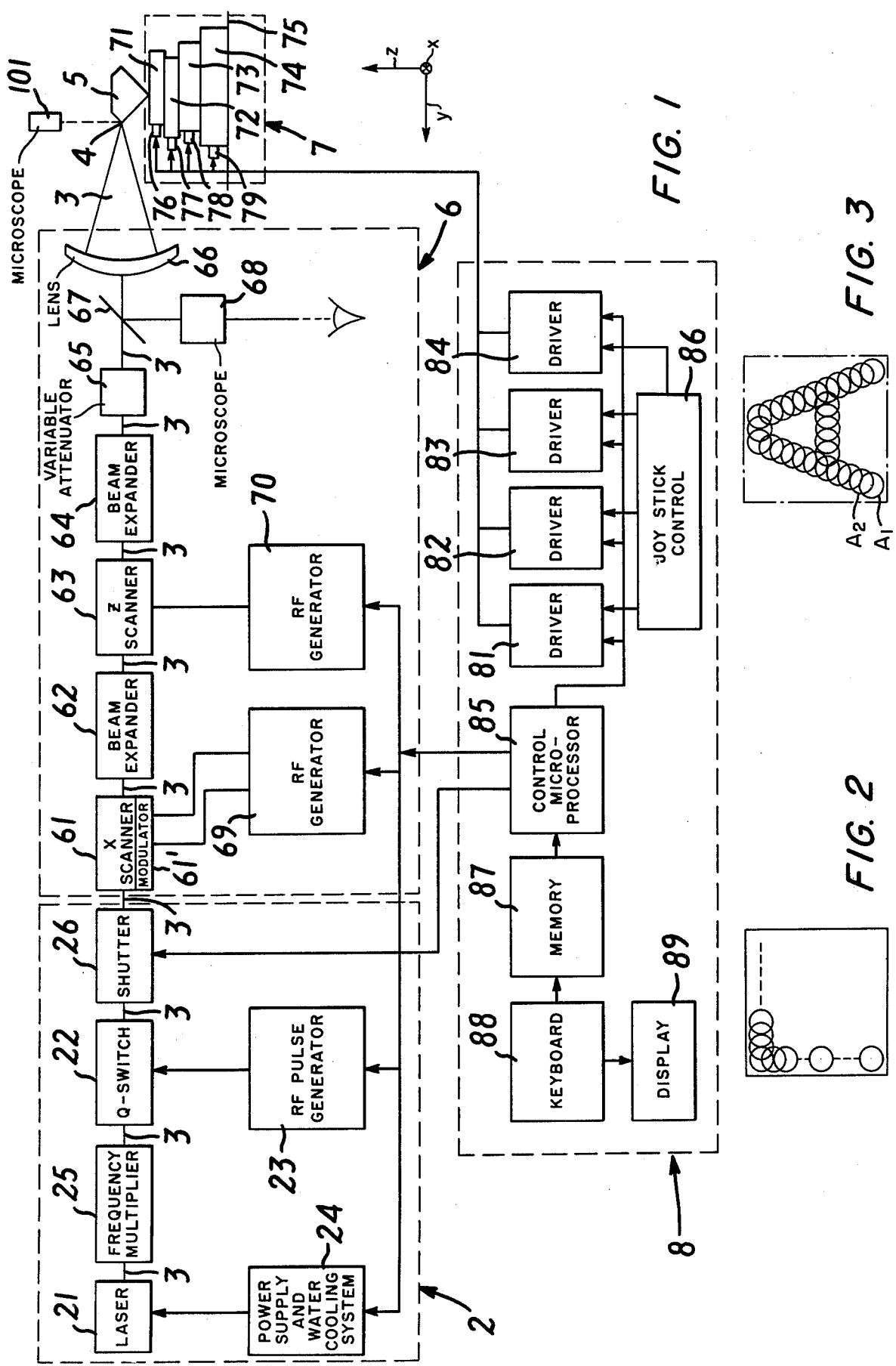

METHOD AND APPARATUS FOR PLACING IDENTIFYING INDICIA ON THE SURFACE OF PRECIOUS STONES INCLUDING DIAMONDS

BACKGROUND OF THE INVENTION

This invention pertains to handling of precious stones or gems and, in particular, to a method and apparatus for placing indicia on the surface of such stones.

In the handling of precious stones, it is common practice to categorize the stones in terms of various characteristics. Thus, for example, diamonds typically are categorized in terms of color, weight, degree of perfection and vendor. Since these categories control the value of a stone, it is essential that they follow the stone through its travel from the original vendor to the eventual purchaser. Heretofore, however, it has not been possible to indelibly mark or place this information directly on the stone without defacing it and, therefore, reducing its value. As a result, the information must be communicated apart from the stone at the time of transfer. This practice is not without risk, since there is always a possibility that the information might be lost or misplaced or purposely misrepresented. In the case of lost or misplaced information, recategorization would have to be carried out at considerable expense in equipment, and manpower in order to reestablish the stone value. Purposely misrepresenting the information, on the other hand, could result in a defrauding of the purchaser.

It is therefore an object of the present invention to provide a practice for placing indicia on a precious stone in a manner which preserves the value of the stone.

It is a further object of the present invention to provide a system and apparatus for placing identifying indicia on a precious stone such that the indicia cannot be removed without reducing the value of the stone.

SUMMARY OF THE INVENTION

In accordance with the principles of the present invention, the above and other objectives are realized in a practice wherein an identifying indicium is placed on a precious stone through application to the stone surface of a beam of laser light which is so controlled as to scribe in the stone surface the desired indicium. Use of a laser beam enables realization of extremely small scribing beam widths so as to result in an indicium which is imperceptible to the human eye. Loss of value of the stone is thus substantially avoided, while an indelible and integrated identification is created in the sense that removal of the indicium could not readily be carried out by most people handling the stone and would necessitate recutting of the stone to an extent which would result in a loss in value.

In the practice of the invention to be disclosed hereinafter, the precious stone being inscribed is a diamond. The laser beam is focused on the diamond surface and is scanned over a path defined by the indicium to result in the desired inscription. Also, in the disclosed embodiment, at the start of each inscription, the energy of the beam imparted to the diamond is sufficient to cause graphitization. The remainder of the inscription is then able to be effected at lesser power.

BRIEF DESCRIPTION OF THE DRAWINGS

The above and other features and aspects of the present invention will become apparent upon reading the following detailed description in conjunction with the accompanying drawings in which:

FIG. 1 illustrates in block diagram form a system for providing indicia to a precious stone in accordance with the principles of the present invention;

FIG. 2 illustrates the matrix of positions to which the laser beam of the system of FIG. 1 can be directed;

FIG. 3 shows a laser beam locations defining a typical indicium which can be inscribed utilizing the system of FIG. 1.

DETAILED DESCRIPTION

In FIG. 1, a laser beam generation system 2 applies a pulsed laser beam 3 to a diamond 5 for the purpose of inscribing an indicium or a plurality of indicia in the diamond surface 4. The indicia can be of any type such as, for example, numbers, letters, words, decorative patterns, trademark symbols, portraits, images, signets, coats of arms, names, family crests, etc. Furthermore, the indicia can be indicative of the above-mentioned categories of information (color, weight, degree of perfection, vendor) related to the diamond value.

As shown, the surface 4 is what is commonly referred to as the "girdle" of the diamond. However, it should be pointed out that the principles of the invention are applicable to incription of indicia in any surface of the diamond 5. Similarly, the principles of the invention are applicable to inscription of precious stones other than diamonds, although the practice of the invention is particularly beneficial for diamond inscription due to the ability of laser radiation to penetrate the hard diamond surface.

Application of the laser beam 3 to the surface 4 is controlled by an optical system 6 which is situated between the beam generation system 2 and the diamond 5. The optical system 6 positions and controls the beam 3 such that the beam is able to inscribe or engrave the surface 4 and produce an indelible indicium which substantially preserves the value of the diamond and which, if removed, would appreciably reduce such value.

In accordance with the invention, the expanse of the beam 3 at the surface 4 having sufficient intensity to inscribe the diamond 5 (referred to hereinafter as the "beam scribing width") is maintained at approximately 100 microns or less so as to produce an indicium of similar width and, therefore, one imperceptible to the human eye. While all beam widths within the aforesaid range are useable with the invention, it is perferable to select the beam scribing width such that the resultant indicium can be readily observed with magnification equipment presently used by jewelers in the industry. Thus, a beam scribing width resulting in an indicium capable of being read by a conventional ten (10X) power magnifying loupe would be beneficial, as this loupe is one that is commonly used in the trade. The optical system 6 provides beam scribing widths of the desired expanse by focusing the beam 3 and by ensuring that the beam is positioned during inscription such that the surface area being inscribed is within the depth of field of the focused beam.

A table system 7 supports the diamond 5 and is adjusted to maintain the surface 4 of the diamond at the beam 3 focus position during the inscription process. The latter table system, as well as the optical system 6 and the laser generator 2 are sequentially controlled by a computer control system 8.

The table system 7 includes four tables 71, 72, 73 and 74 which are stacked one on the other and which together are mounted on a stationary support or frame 75. Each of the tables 71–74 enables a particular mode of movement of the diamond 5. Translational movement along the x and y directions of a mutually orthogonal coordinate system x,y,z is effected by tables 71 and 72, respectively, the x and y directions being horizontal directions into and in the plane of the drawing respectively. The diamond 5 is rotated about the z direction (a vertical direction in the plane of the drawing) by operation of the table 73. The final movable table 74 provides further translation of the diamond in the y direction.

Stepping motors 76, 77, 78 and 79 drive the tables 71–74, respectively, and, in turn, receive analog activation signals from drive elements 81–84 of computer control system 8. These drive elements are addressed automatically by signals from a control micro-processor 85 or manually by a joy stick control system 86. Positional feedback signals also are fed to the drivers from their respective tables.

Useable components for the tables 71 and 72 might be tables manufactured under model number DC-33 by Design Components Incorporated. Tables manufactured by the latter manufacturer under model numbers RT-601 and LP-35 might be used for the tables 73 and 74, respectively. The motors 76–79 might, in turn, be model number 49FG motors manufactured by PMI Motors.

A memory 87 of the computer control system 8 stores instructions and data (e.g., special and standard indicia instructions and data) for carrying out the inscription process. This information is processed by the micro-processor 85 to develop the necessary signals for sequentially controlling operation of the laser generation system 2, optical control system 6 and table system 7. A keyboard unit 88 permits entry of operator control instructions, including instructions defining the particular indicia to be inscribed. A system display 89 enables keyboard data to be displayed to ensure correct entry and allows prompting of the operator during system operation.

A Rockwell 6502 microcprocessor might serve as to micro-processor system 85, while the memory 87 might comprise a PROM section (for special indicia information) in the form of two 2708 ultraviolet programmable-read-only memories and a ROM section (for standard indicia information). The display 89 might include a 6543 Rockwell controller providing instructions to a CIOTO monitor. Each of the drivers 81–84 might include 74193 bi-directional counters and digital-to-analog converters (DAC-80) having 12 bits of resolution.

Turning to the laser generator 2, a continuous laser source 21 applies the laser beam 3 to a Q-switch 22 which is varied in state to allow high peak power pulses of the beam to pass to the optical system 6. Q-switch RF pulse generator 23 establishes the state of Q-switch 22 as a function of signals from the micro-processor 85.

A frequency multiplier 25 is interposed between laser 21 and Q-switch 22 in order to increase the frequency of the laser radiation and, therefore, obtain radiation of reduced wavelength. This permits obtaining smaller beam scribing widths at the surface 4. Typically, if a Nd-YAG laser at 1.06 microns were used as the laser 21, the multiplier 25 might be a frequency doubler, if beam scribing widths in the range of 1 to 100 microns were desired. To complete the laser generation system, a normally opened safety shutter 26 is provided in the path of the beam 3 forward of the Q-switch 22, the shutter 26 being closed upon micro-processor 85 generating a signal indicating an unsafe condition in the system.

Passage of the beam 3 through the safety shutter 26 brings the beam to the optical system 6. A first scanner or deflector 61 is adapted to deflect the beam in intermittent or digital fashion in the x-direction. Following the deflector 61, is a beam expander 62 which expands the beam 3 prior to entry into a second scanner or deflector 63 which is adapted to deflect in intermittent or digital fashion the beam in the z-direction. A second beam expander 64 follows the deflector 63 and conveys the beam to a variable attenuator 65 which sets the relative intensity or power of the beam before the beam impinges upon a focusing means in the form of an objective lens 66. The latter lens focuses the beam 3 at a point adjacent the surface 4 of the diamond 5.

Control of the x and z scanners 61 and 63 is through x and z RF scan generators 69 and 70 which, in turn, are addressed by signals from the micro-processor 85. The x scan generator also provides on-off control of modulator 61' likewise based on signal control from the micro-processor.

Typical components for the scanners 61 and 63 might be acousto-optic deflectors of the type manufactured by Intra-Action Corporation under model number ADM-70. The scan generators 69 and 70, in turn, might be components designated DE-70M and manufactured by the same company.

Prior to inscription of indicia on the diamond 5, an initial procedure must be carried out to provide the computer system 8 with information as to the indicia length and the geometry of the surface 4. The latter surface can take on various forms and might comprise plane surfaces (facets) connected by edges or it might be a continuous surface with or without curvature. The indicia and surface geometry information enables the computer system to develop, via calculation subprograms stored in memory 87, the necessary signals for controlling the table system 7 to properly index the diamond 5 and to bring successive regions of surface 4 into confronting relationship with the beam 3 at the point of focus thereof. Viewing microscopes 101 and 68 mounted above and in front of the diamond 5 are provided as an aid to obtaining this information. As shown, microscope 101 permits direct viewing of the diamond from the above, while microscope 68 permits viewing the diamond frontally via beam splitter 67.

Discussion of this initial procedure will be in the context of the surface 4 being at the girdle of the diamond 5, but the procedure can be readily adapted to other surface areas. The operator begins the procedure by introducing into the memory 87, via the keyboard 88, a code indicative of the indicia to be inscribed. The micro-processor 85 is thereupon initiated again by keyboard operation to calculate and store in the memory 87, the total length encompassed by the entered indicia. The diamond is then viewed with the microscope 68 and the diamond fixture (now shown) is moved along the z direction by a micrometer (not shown) to first align the upper and then the lower girdle edges with the microscope horizontal cross-hair. The difference in the micrometer readings at these alignment positions is then taken by the operator who enters same via keyboard 88 into the memory 87.

The operator then views the diamond from above with the microscope 101 and operates the joy stick control 86 to move the tables 71 and 72 to displace the diamond in the x and y directions such that a point on the profile of the girdle is brought to the intersection of the cross-hairs of the microscope. When performing this operation, if the operator views one or more facet edges, the operator enters via the keyboard 88 a code indicating to the micro-processor that the information being introduced is to be analyzed with a sub-program adapted to faceted surfaces and stored in the memory 87. If the operator views no facet edges, indicating a continuous surface, then no entry is made and the micro-processor will then automatically analyze the introduced information with a sub-program adapted to curved surfaces. Having conditioned the micro-processor regarding the type of sub-program to be used based on the surface, a keyboard store key is depressed and the locations of tables 71 and 72 are conveyed from the respective drive elements, via micro-processor 85, to the memory 87.

The operator then again operates the joy stick control to move tables 71 and 72 and bring a further point on the girdle to the intersection of the cross-hairs. The type of the control exercised in this operation depends upon which sub-program is in effect. If the sub-program adapted to curved surfaces is in use, the table 71 is first moved to provide a fixed x displacement to the diamond. This is followed by operation of table 72 to provide a y displacement sufficient to bring the further point into coincidence with the cross-hairs. If the sub-program adapted for faceted surfaces is in use, movement of the tables provides x and y displacement sufficient to bring the edge of the next facet to the intersection of the cross-hairs. Once the further surface point is brought to the cross-hair intersection, the table displacements are again entered into the memory 87.

The aforesaid procedure of moving the tables to place additional points of the girdle profile at the intersection of the microscope cross-hairs and the storing the table displacement is continued until the sum of the facet lengths exceeds the previously stored indicia total length. This is automatically calculated by the micro-processor and displayed on the display 89.

At this point, the micro-processor has all the necessary data needed regarding the indicia and diamond surface geometry to properly orient the diamond. In the case of curved surfaces, the entered data is utilized by the sub-program to derive the radius of curvature and center of rotation of the surface. The tables 71, 72 and 74 are thereupon moved to place the center of rotation at the center of rotation of the table 73 and to place a starting point on the girdle at the focus point of the beam 3. In the case of a faceted surface, the entered data is utilized to determine the intersection angle of the facets. The tables are thereupon moved to place a faceted surface orthogonal to the axis of the beam 3 and to place a point on such surface adjacent the facet edge at the beam 3 focus.

Having positioned the diamond as above-described, based on the geometry of the surface 4 and the indicia length, subsequent indexing of the diamond for indicia inscription can now be readily carried out by the micro-processor controlling the table system 7. In the case of curved surfaces, this indexing amounts merely to rotation of the table 73 to bring a non-inscribed area to the beam 3 focus. For faceted surfaces, translational movement of table 71 brings such area to the beam focus. In this case, however, if the inscription length exceeds the length of the facet, or if a character falls on a facet intersection, the micro-processor 85, having stored the intersection locations, will signal the table system 7 to bring the next facet into position in a similar fashion as the previous facet.

Once the above initial procedure is completed, the system is ready to inscribe the surface 4 of diamond 5 with the entered indicia. Inscription is initiated by the operator again activating the keyboard 88.

The operator also turns on the power supply and cooling system 24 to bring the laser 21 into operation. Signals are then provided by the micro-processor to the generators 69 and 70 to condition the digital scanners 61 and 63 to provide given amounts of x and z deflection to the beam 3. In the case of acousto-optic deflectors, this would amount to establishing in each deflector an acoustic disturbance at a radio frequency associated with the desired amount of beam deflection.

As can be appreciated, the generators 69 and 70 and deflectors 61 and 63 define an array of positions, shown in FIG. 2, to which the beam 3 can be deflected. The present excitation signals delivered by the micro-processor 85 to the generators, in effect, select one of these positions, which is the beginning position for the present inscription.

The generator 69 also delivers a signal to key the modulator 61' on/off. In the present illustrative case, this signal places the modulator in the full on condition; thereby allowing the beam 3 to pass at full intensity. Such intensity is sufficient to result in the focused beam 3 inscribing the surface 4 in the area covered by the inscribing beam width. Typically, for most applications, the power in beam 3 as it exits variable attenuator 65 might be in the range of 0.5 to 5 kW, the particular value used, amongst other things, being dependent upon the scan rate and pulse rate of the beam 3. A typical scan rate might be 1 millimeter per second and a typical pulse rate 1 kHz.

Having established the initial deflection conditions and the appropriate modulator condition, the micro-processor 85 now signals the generator 23 to operate Q-switch 22 and thereby allow passage of the beam 3 through the optical system 6 to the surface 4 of the diamond 5. During such passage, the beam 3 is deflected by respective scanners 61 and 63, allowed to pass at full intensity by the variable attenuator 65, and brought to focus on the surface 4, whereby, as shown in FIG. 3, a first elemental area $A_1$ of the surface is inscribed.

Thereafter, the deflection amounts are indexed based upon the micro-processor 85 indexing the signals to the generators 69 and 70 pursuant to the program in the memory 87 and the Q-switch is operated, resulting in subsequent elemental areas $A_2, \ldots A_N$ being inscribed in the surface 4 until the desired indicium, shown as an A in FIG. 3, is completed. The micro-processor 85 then signals the pulse generator 23 to again close the Q-switch 22, thereby inhibiting further impingement of the beam 3 on the diamond surface.

If the original operator instructions required further indicia to be inscribed, the micro-processor 85 addresses the appropriate driver element (81 for faceted surfaces and 83 for curved surfaces) causing same to actuate its respective motor and its corresponding table. The diamond 5 is thus indexed to bring a non-inscribed area of the surface 4 to the focus point of the beam 3. After such indexing, the micro-processor again signals the generators 69 and 70 to establish deflection amounts in the scanners 61 and 63 for situating the beam 3 at a first position defining the start of the second indicium. The pulse generator 23 is then addressed by the microprocessor 85 operating Q-switch 22 which allows passage of the beam 3. Inscription of a first elemental area of the second indicium results. Subsequent indexing of the generators 67 and 68 as above-described, results in the production of the desired second indicium on the surface 4. Further indicia are then inscribed in the same manner.

As can be appreciated from the above description, the Q-switch 22 remains operational after each elemental area ($A_1, A_2 \ldots A_N$) is inscribed and remains operational when the system is conditioned to inscribe the next elemental area. As can be further appreciated, when the next elemental area is at the beginning of the next indicium, the Q-switch remains closed for a longer time than if the next area were on the same indicium. As a result, the pulse of beam 3 delivered to each first inscription elemental area (for example $A_1$) is of greater energy than the later pulses delivered to subsequent areas of the same indicium. This higher energy pulse at the beginning of each inscription provides a needed initial graphitization of the diamond surface. This graphitization, in turn, conditions the adjacent surface area so that it is now able to better absorb laser energy. The lesser energy pulse which follows the initial pulse and confronts this adjacent area is thus able to graphitize and inscribe such area. In doing so it overlaps and conditions its subsequent surface area which, upon receipt of the next pulse, is also now able to be graphitized and inscribed. This process of conditioning a surface area followed by graphitization and inscription of same by the lesser energy pulses continues until the indicium inscription is completed.

In order for graphitization to occur on the first pulse after operating the Q-switch 22, as above-described, the energy of this pulse has to be at an appropriate level. Consequently, micro-processor 85 should maintain the Q-switch closed between inscriptions for a length of time sufficient to result in an initial pulse of such energy or greater. In the case of a Nd-YAG laser, this would mean maintaining the Q-switched closed for approximately 1 or more milliseconds.

Furthermore, when inscribing an indicium requiring movement of the beam 3 to an elemental area removed from a previously inscribed elemental area, (i.e., to a non-adjacent elemental area), an initial graphitization similar to that at the start of the inscription is again needed. As a result, a similar high energy pulse is required. The micro-processor 85 at these transitions thus also ensures that Q-switch 22 is closed for a long enough time that the next laser pulse has sufficient energy to provide graphitization.

As above-described, the stepping of the beam 3 to inscribe areas of the surface 4 defining a given indicium is such that successively inscribed elemental areas ($A_1$, $A_2$, for example) overlap. This overlap further ensures that the beam 3 will graphitize and inscribe the successive areas. It also results in an inscription which is substantially uniform and, therefore, easily readable with the appropriate magnification. A useable overlap for which such uniform condition pertains is about 85 percent.

It should be pointed out that, in the case of some ultra-clear or highly polished diamonds, an initial Q-switched pulse of the above-described magnitude might still not result in graphitization of the diamond surface. As a result, when inscribing diamonds of this character, it is desirable to apply an energy absorbing material such as, for example, a liquid suspension of carbon black, to the surface 4 prior to inscription. Once this material dries, subsequently applied laser energy will be absorbed and inscription can then be more successively carried out.

Once inscription of the diamond 5 has been completed, the operator using microscope 68 and oblique illumination can view the surface 4 to see whether the inscription was correctly carried out. In this way, if an indicium is not inscribed, the operator can communicate this to the computer control system 8 and the system 8 can return to the area of the diamond and inscribe the required indicium.

It should be pointed out that the present inscription practice is believed to be highly advantageous in that it not only does not diminish the value of the diamond 5, but, in fact, adds value to the diamond through the inscribed indicia. Thus, for example, inscription of the origin of the diamond (i.e., the vendor name or trademark), enables the diamond to be easily identified, thereby protecting the diamond against loss or theft. Likewise, indicia indicative of the diamond value, prevent misrepresentation of such value, thereby affording protection against possible fraudulent practices.

In all cases, it is understood that the above-described arrangements are merely illustrative of the many possible specific embodiments which represent applications of the invention. Numerous and varied other arrangements can readily be devised in accordance with the principles of the present invention without departing from the spirit and scope of the invention. For example, if the system requirements dictate that the Q-switch 22 cannot be operated to produce an initial pulse sufficient to cause graphitization, the latter can be effected by allowing not only the high energy initial pulse but also one or more lesser energy pulses to impinge upon the initial surface area to be inscribed. In such case, the micro-processor 85 would control the scanners to hold their deflection states until the desired number of pulses impinge upon the surface area. If desired, subsequent surface areas also may be confronted by more than one pulse by using a similar practice.

What is claimed is:

1. A method for providing an identifying indicium to a diamond comprising:

applying a laser beam to a surface of said diamond;

and controlling said laser beam to enable said laser beam to inscribe into said diamond surface an indicium including:

intermittently moving said laser beam to successive positions on said diamond surface along a path corresponding to said indicium, said beam at each position covering a diamond surface area overlapping the diamond surface area covered by the beam at the immediately preceding position on said indicium;

and adjusting the laser beam power to graphitize and inscribe said diamond surface at each of said positions.

2. A method in accordance with claim 1 wherein: said indicium is indelible.

3. A method in accordance with claim 2 wherein: said indicium is of any preselected character.

4. A method in accordance with claim 2 wherein: said indicium is indicative of the origin of said diamond, whereby said diamond can be identified if stolen or lost.

5. A method in accordance with claim 2 wherein: said indicium is indicative of the value of said diamond, whereby said value cannot be misrepresented.

6. A method in accordance with claim 5 wherein: said indicium is indicative of one of the color, weight, degree of perfection and vendor of said diamond.

7. A method in accordance with claim 1 wherein: controlling of said laser beam is such that said inscribed indicium is of a character which substantially preserves the value of said diamond.

8. A method in accordance with claim 1 wherein: controlling of said laser beam is such that said inscribed indicium is of a character which would result in an appreciable reduction in the value of said diamond if said indicium were removed.

9. A method in accordance with claim 1 wherein: said inscribed indicium is imperceptible to the human eye.

10. A method in accordance with claim 1 wherein: the intensity, width and time duration of application of said laser beam are controlled to inscribe said indicium.

11. A method in accordance with claim 1 wherein: the expanse of said laser beam having sufficient intensity to inscribe said diamond is controlled to be equal to or less than approximately 100 microns at said surface.

12. A method in accordance with claim 11 wherein: the expanse of said laser beam having sufficient intensity to inscribe said stone is controlled to be equal to or greater than approximately 1 micron at said surface.

13. A method in accordance with claim 11 wherein: the expanse of said laser beam having sufficient intensity to inscribe said stone is controlled to be equal to or greater than approximately 10 microns at said surface.

14. A method in accordance with claim 1 wherein: the power of said laser beam is controlled to be within a range of approximately 0.5 to 5 kW at said surface.

15. A method in accordance with claim 1 wherein: controlling of said laser beam includes adjusting the laser beam power to a level sufficient to graphitize said diamond at the start of inscribing said indicium.

16. A method in accordance with claim 1 wherein: moving of said beam includes deflecting said beam in a first direction and a second direction transverse to said first direction.

17. A method in accordance with claim 16 wherein: the degree of deflection of said beam in said first and second directions is changed intermittently.

18. A method in accordance with claim 1 wherein: said surface is on the girdle of said diamond.

19. A method in accordance with claim 1 wherein: controlling of said beam includes focusing said beam onto said surface of said stone.

20. A method in accordance with claim 1 wherein: said beam is controlled to inscribe a plurality of further indicia on said surface.

21. A method in accordance with claim 20 further including: maintaining said diamond stationary during inscription of each said indicium and moving said diamond subsequent to inscription of an indicium and prior to the inscription of the next successive indicium to bring a non-inscribed area of said surface into confronting relationship with said beam.

22. A method in accordance with claim 21 wherein: said method further includes initially orienting said diamond to situate the center of rotation of said surface at a point which is on the axis of said beam and which is spaced from the point of focus of said beam by a distance equal to the radius of curvature of said surface; and moving of said diamond includes rotating said diamond about said point to bring each non-inscribed area into confronting relationship with said beam, whereby said beam is maintained in focus on the successive areas of said surface being inscribed.

23. A method in accordance with claim 19 further comprising: prior to initially orienting said diamond, moving said diamond to at least three positions for which said surface is at the point to which said beam is to be focused and calculating from said positions the center of rotation and radius of curvature of said surface.

24. A method in accordance with claim 21 wherein: said method further includes initially orienting said diamond to situate said surface orthogonal to the axis of said beam;

and moving of said diamond includes translating said diamond to bring each non-inscribed area into confronting relationship with said beam, whereby said beam is maintained in focus on the successive areas of said surface being inscribed.

25. A method in accordance with claim 24 further comprising: prior to initially orienting said diamond, moving said diamond to a number of positions for which said surface is at the point to which said beam is to be focused and calculating from said positions the intersection angle of said surfaces.

26. A method in accordance with Claim 1 wherein:
said diamond has an energy absorbing material on said surface;
and said method further comprises adjusting said laser beam such that a pulse of said beam applied to a first position on the path of said indicium is of higher energy than that of the pulses applied to succeeding positions on said path.

27. A method in accordance with claim 26 wherein: said material is carbon black.

28. A method in accordance with claim 26 further comprising:
applying said energy absorbing material to said surface of said diamond.

29. A method in accordance with claim 1 wherein: applying said laser beam includes Q-switching the output of a continuous laser source.

30. Apparatus for providing an identifying indicium to a diamond comprising:
means for controllably applying a laser beam to a surface of said diamond to inscribe into said diamond surface an indicium including:
means for intermittently moving said laser beam to successive positions on said diamond surface along a path corresponding to said indicium, said beam at each position covering a diamond surface area overlapping the diamond surface area covered by the beam at the immediately preceding position on said indicium;
and means for adjusting the laser beam power to graphitize and inscribe said diamond surface at each of said positions.

31. Apparatus in accordance with claim 30 wherein: said applying means controls said laser beam such that said inscribed indicium is indelible.

32. Apparatus in accordance with claim 30 wherein: said applying means controls said laser beam such that said inscribed indicium is of a character which substantially preserves the value of said diamond.

33. Apparatus in accordance with claim 30 wherein: said applying means controls said laser beam such that said inscribed indicium is of a character which would result in an appreciable reduction in the value of said diamond if said indicium were removed.

34. Apparatus in accordance with claim 30 wherein: said applying means controls said beam such that said inscribed indicium is imperceptible to the human eye.

35. Apparatus in accordance with claim 30 wherein: said control means provides an expanse of said laser beam having sufficient intensity to inscribe said surface which is equal to or less than approximately 100 microns at said surface.

36. Apparatus in accordance with claim 35 wherein: said control means provides an expanse of said laser beam having sufficient intensity to inscribe said surface which is equal to or greater than approximately 1 micron at said surface.

37. Apparatus in accordance with claim 38 wherein: said control means includes a lens means for focusing said beam onto said surface.

38. Apparatus in accordance with claim 30 wherein: said adjusting means provides a laser beam of sufficient power such that the power of said beam is within a range of approximately 0.5 to 5 kW at said surface.

39. Apparatus in accordance with claim 30 wherein: said adjusting means adjusts the laser beam power to a level sufficient to graphitize said surface at the start of inscribing said indicium.

40. Apparatus in accordance with claim 30 wherein: said adjusting means includes a Q-switch.

41. Apparatus in accordance with claim 30 wherein: said generating means includes a continuous laser source.

42. Apparatus in accordance with claim 30 wherein: said moving means further includes: means for deflecting said beam in a first direction; and means for deflecting said beam in a second direction transverse to said first direction.

43. Apparatus in accordance with claim 47 wherein: said deflecting means each include a digital deflector.

44. Apparatus in accordance with claim 30 wherein: said beam is controlled to inscribe a plurality of further indicia on said surface.

45. Apparatus in accordance with claim 44 further including: means for maintaining said diamond stationary during inscription of each said indicium and moving said diamond subsequent to inscription of the next successive indicium to bring a non-inscribed area of said surface into confronting relationship with said beam.

46. Apparatus in accordance with claim 45 wherein: said diamond moving means includes:
a first table means for translating said diamond in a first direction;
a second table means for translating said diamond in a second direction;
a third table means supporting said first and second table means for rotating said diamond;
and a fourth table means for supporting said third table means and translating said diamond in said first direction.

47. Apparatus in accordance with claim 45 further including: computer means for sequentially controlling the operation of said applying means, beam moving means and said diamond moving means.

48. Apparatus in accordance with claim 30 wherein: said diamond has an energy absorbing material on said surface;
and said means for adjusting said laser beam further includes means for causing a pulse of said laser beam applied to a first position on the path of said indicium to be of higher energy than that of the pulses applied to succeeding positions on said path.

49. Apparatus in accordance with claims 30 wherein: said surface is on the girdle of said diamond.

50. A method for providing an identifying indicium to a diamond, a surface of said diamond having an energy absorbing material thereon, comprising:
applying a laser beam to said surface of said diamond;
and controlling said laser beam to enable said laser beam to inscribe into said diamond surface an indicium including:
intermittently moving said laser beam to successive positions on said diamond surface along a path corresponding to said indicium, said beam at each position covering a diamond surface area overlapping the diamond surface area covered by the beam at the immediately preceding position on said indicium;
and adjusting the laser beam power to inscribe said diamond surface at each of said positions including causing a pulse of said laser beam applied to a first position on the path of said indicium to be of higher energy than that of the pulses applied to succeeding positions on said path.

51. A method in accordance with claim 50 further comprising:
applying said energy absorbing material to said surface.

52. Apparatus for providing an identifying indicium to a diamond, a surface of said diamond having an energy absorbing material thereon, comprising:
means for controllably applying a laser beam to said surface of said diamond to inscribe into said diamond surface an indicium including:
means for intermittently moving said laser beam to successive positions on said diamond surface along a path corresponding to said indicium, said beam at each position covering a diamond surface area overlapping the diamond surface area covered by the beam at the immediately preceding position on said indicium;
and means for adjusting the laser beam power to inscribe said diamond surface at each of said positions including causing a pulse on said laser beam applied to a first position on the path of said indicium to be of higher energy than that of the pulses applied to succeeding positions on said path.

* * * * *